United States Patent [19]

Beller

[11] 4,442,762
[45] Apr. 17, 1984

[54] MEAT ROASTER

[75] Inventor: Frank W. Beller, Aurora, Ill.

[73] Assignee: Belson Manufacturing Co., Inc., North Aurora, Ill.

[21] Appl. No.: 357,330

[22] Filed: Mar. 11, 1982

[51] Int. Cl.³ .............................................. A47J 37/07
[52] U.S. Cl. ........................................ 99/427; 99/340; 99/449; 99/450
[58] Field of Search .................. 99/427, 447, 340, 402, 99/401, 443 R, 450, 421 H, 450, 449

[56] References Cited

U.S. PATENT DOCUMENTS

| 2,826,981 | 3/1958 | Chick | 99/397 |
|---|---|---|---|
| 3,084,615 | 4/1963 | Smith | 99/402 X |
| 3,103,161 | 9/1963 | Whitehead | 99/427 |
| 3,163,103 | 12/1964 | Shoup | 99/427 |
| 3,188,939 | 6/1965 | Smith | 99/402 X |
| 3,285,160 | 11/1966 | Smith | 99/427 |
| 3,363,543 | 1/1968 | Roberts et al. | 99/427 X |
| 3,769,901 | 11/1973 | Phillips | 99/444 |
| 3,922,961 | 12/1975 | Case | 99/427 |
| 4,005,646 | 2/1977 | Kruper | 99/427 |
| 4,165,683 | 8/1979 | Van Gilst | 99/393 |

FOREIGN PATENT DOCUMENTS

| 2737417 | 2/1979 | Fed. Rep. of Germany | 99/427 |
|---|---|---|---|
| 607906 | 12/1978 | Switzerland | 99/421 H |

Primary Examiner—Billy J. Wilhite
Attorney, Agent, or Firm—Lee, Smith & Zickert

[57] ABSTRACT

A meat roaster has a horizontal spit basket comprising confronting sets of grate fingers for gripping meat items to be roasted and means for adjusting the separation between the potentially telescoping sets which allows the user to tighten the grip on the shrinking meat during roasting. Roast items in a wide range of sizes can be accommodated by adjusting the grate finger separation. Arms extend from each end of the spit basket to permit hand conveyance and also provide means for support in the roaster. The roaster has a firebox, which is generally rectangular in plan, being open at the top and bottom and having mounting means for rotationally supporting said arms and disposing the spit basket lengthwise along the open top. The firebox provides means for supporting charcoal baskets lengthwise adjacent the open bottom and to the sides of the spit basket. A closable domed lid associates with the firebox to cover the open top. Legs extend downwardly from the firebox below the open bottom to permit entry of air from below and to provide means for making the roaster freestanding on a support surface below. Rising heat is induced to circulate around the spit basket for even heating. An electric motor can be operably associated at either end of the spit basket for rotisserie-style roasting. Alternately, handles may be secured to the arms for manual, rather than motor-driven, rotation of the spit basket.

13 Claims, 8 Drawing Figures

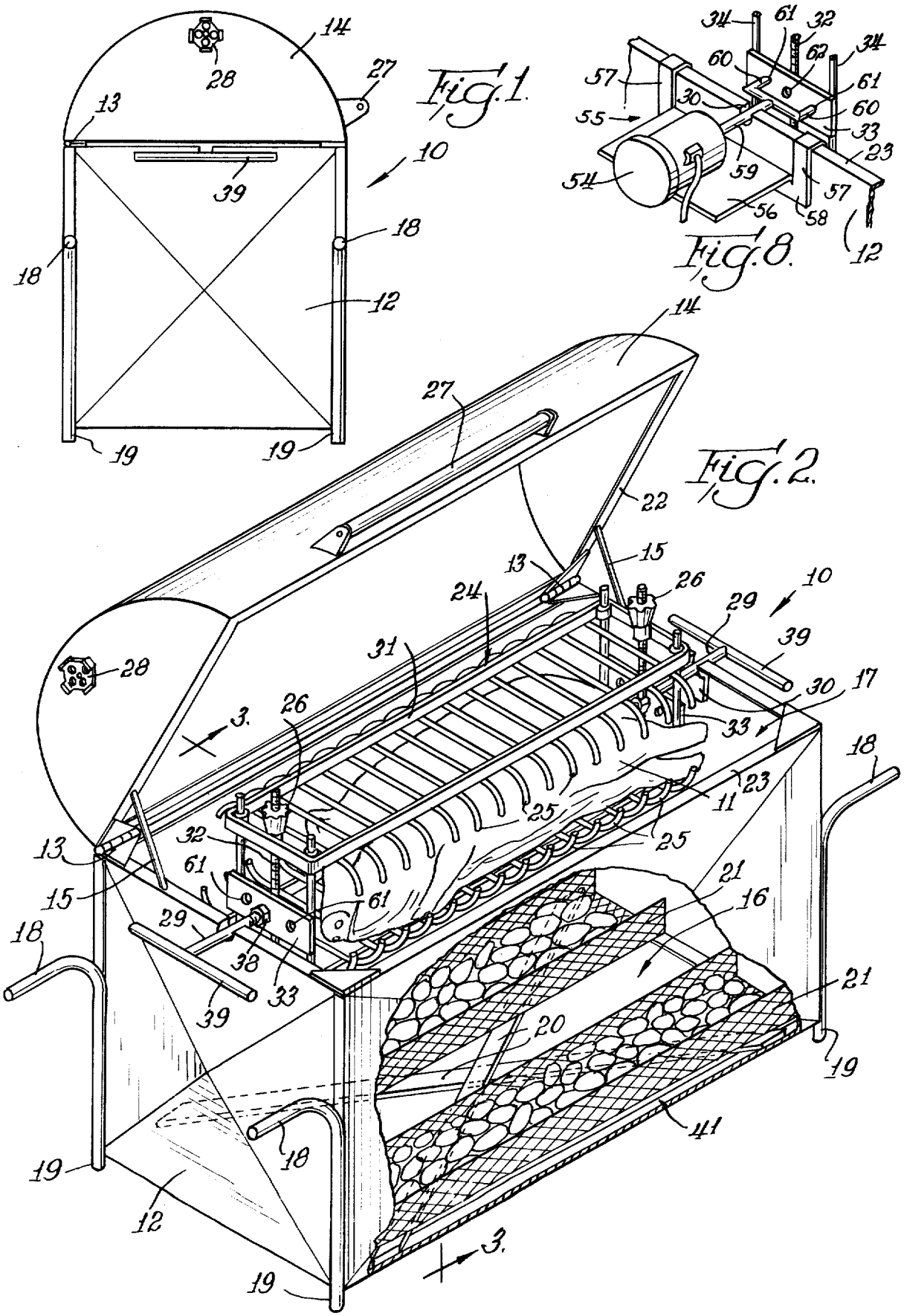

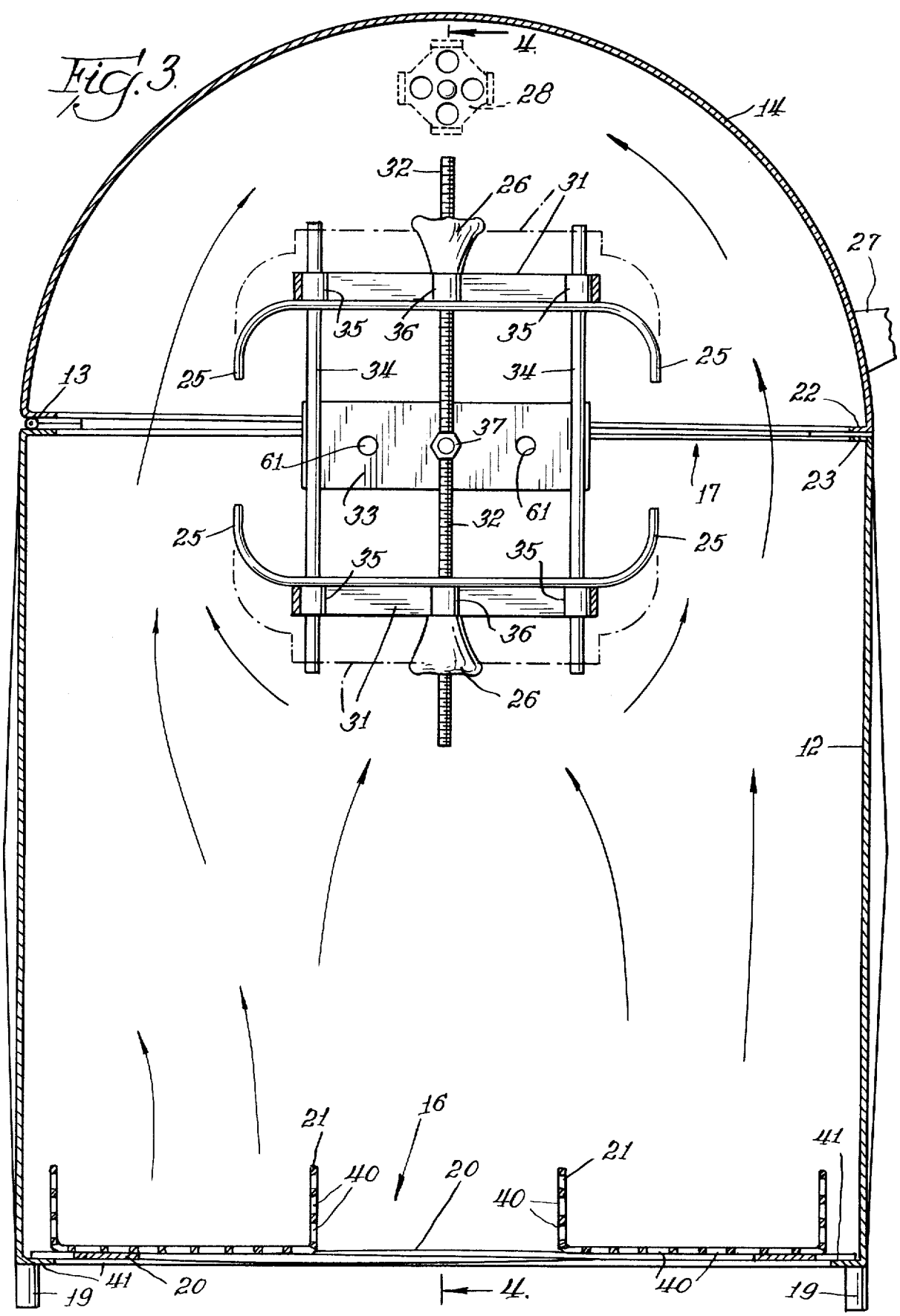

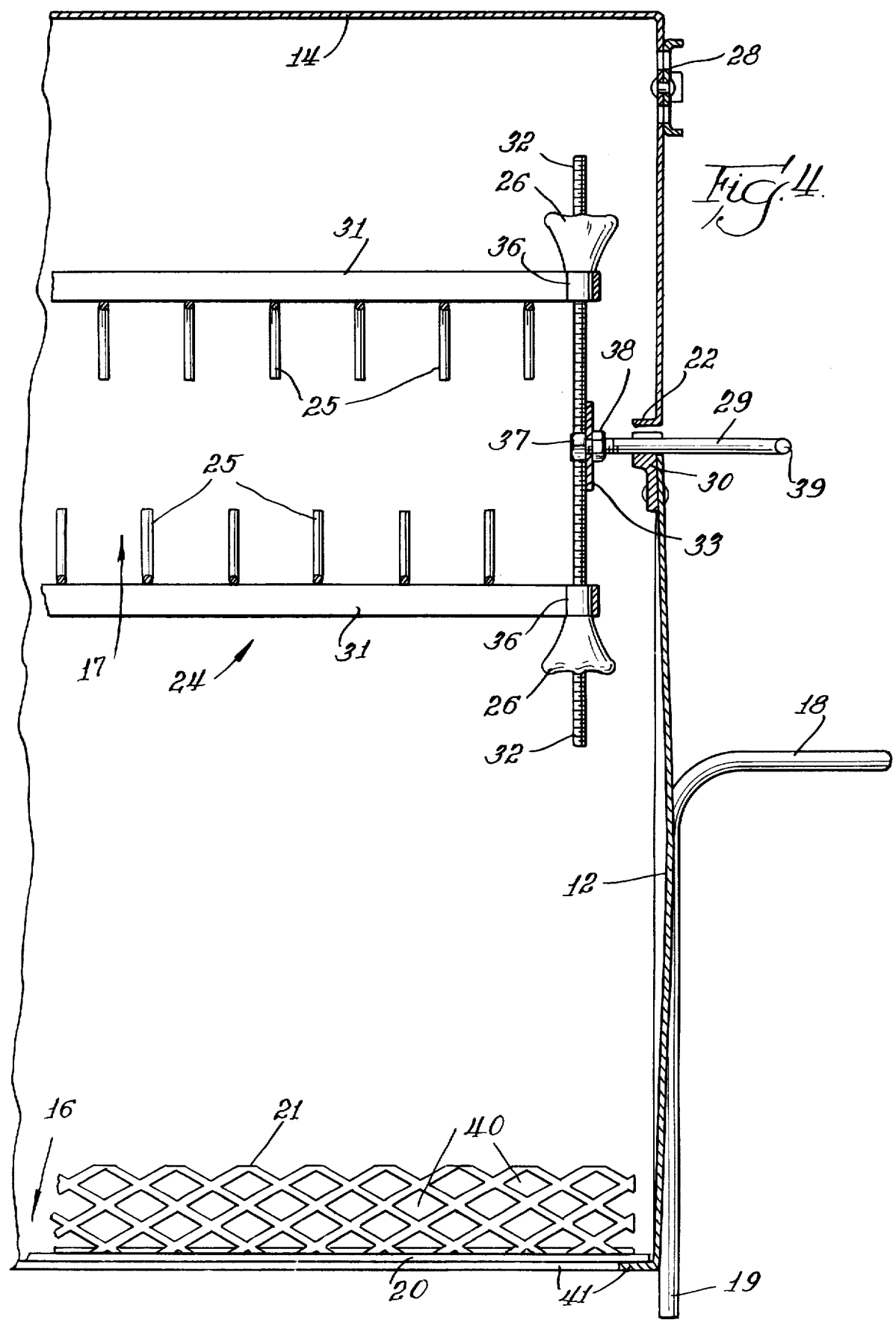

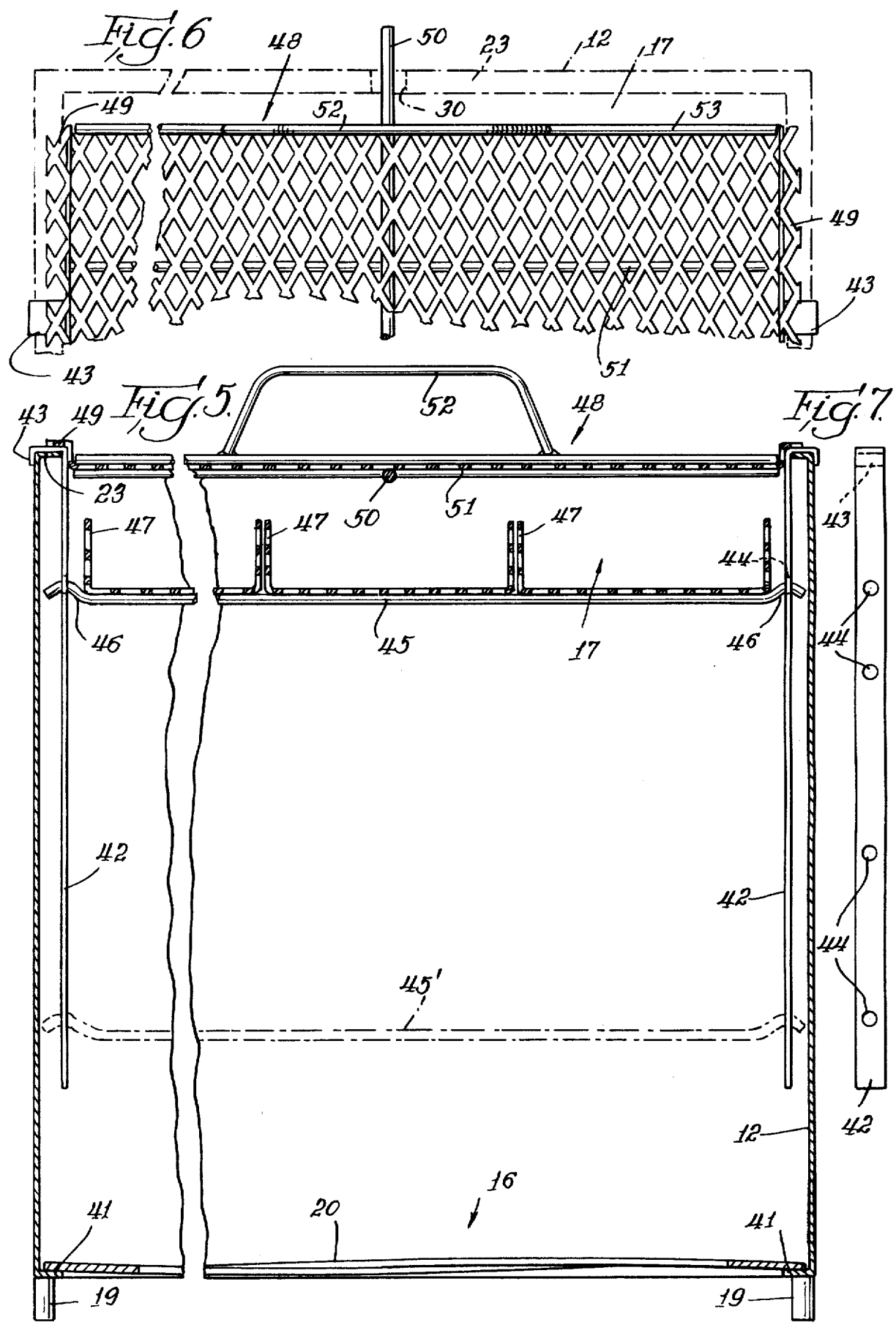

MEAT ROASTER

BACKGROUND AND SUMMARY OF THE INVENTION

The present disclosure is directed toward a large volume meat roaster for use at picnics and the like.

In the preparation of large pieces of meat, for example roasting a pig, a rotisserie is most often used to evenly cook the meat. While the present invention allows for manually rotating the food item for carving and repositioning, it improves on rotisserie-roasting. A closable domed lid directs the rising heat to circulate around and about a novel spit basket to greatly enhance even cooking. With conventional rotisserie-type roasters, flare-ups from grease dripping onto the coals directly below is always a concern. To overcome the problem, the invention positions charcoal baskets to the sides of the spit basket, not directly below. Another problem with prior art roasters centers on the ability of the spit structure to securely retain the item to be roasted. Additionally, the ability to accommodate food items in a variety of sizes has been difficult. In conjunction with rotation of the spit, retention of a large meat item becomes a significant factor in effective cooking procedures. The unique spit basket design can securely retain numerous sizes by incorporating easily adjusted sets of grate fingers.

Initial meat preparation, such as seasoning or stuffing, may occur at a location remote from the final roasting site. The invention allows the cook to make this initial preparation and then firmly secure the food item in the spit basket for transport to the roaster. Arms extend outwardly from the spit basket for hand-carrying and for supporting the spit basket in the roaster.

Also, it has been a problem to provide a large volume meat roaster for outdoor use which is relatively lightweight and easily transported. With the quantity of meat needed for large outdoor social gatherings, heavy roasters and make-shift ovens have been used, but they are cumbersome and often require a substantial effort to transport them to the food preparation site. The invention is a relatively lightweight portable meat roaster which, being provided with handles extending from the firebox, can be easily lifted and carried by two people.

Easy conversion of a roaster from a large item cooking device to one useful for numerous smaller articles, such as hot dogs and hamburgers, would be a great benefit to the consumer. The instant invention is also directed toward providing this feature by including means for quickly adapting the firebox to support a bed of multiple charcoal baskets. A charcoal basket support means allows the user to select a desired elevation for placement of the baskets in the firebox. A removable expanded metal grill is also provided which fits generally in the area otherwise occupied by the spit basket for disposition over the charcoal baskets. The domed lid is closable over the expanded metal grill to facilitate cooking these smaller, but numerous, meat items.

The invention is useful for cooking the full range of foodstuffs capable of being prepared by roasting or broiling, including potatoes and ears of corn, for example, as well as meats, but is particularly suited for roasting large bodies of meat, such as whole pigs.

In achieving the foregoing goals and solving many of the problems with previous attempts at large scale roasters, the invention provides a food roaster which has a spit basket having telescoping sets of grate fingers for gripping meat items to be roasted. It further includes means for adjusting the separation between the telescoping sets, allowing the user to tighten the grip on the meat if it shrinks during roasting. The adjustment also allows for the accommodation of a wide range of sizes by retracting the grate fingers to accept the item and then bringing them together to securely grip it. The spit basket includes arms extending therefrom to permit hand carrying the loaded spit basket, and provides means for support in the roaster.

The roaster disclosed has a firebox which is generally rectangular in plan, being open at the top and bottom, and includes mounting means for supporting the spit basket arms to dispose the spit basket lengthwise along the open top. The firebox provides means for supporting charcoal baskets lengthwise adjacent the open bottom and to the sides of the spit basket. A closable domed lid is hingedly associated with the firebox to cover the open top. Heat rising from the charcoal is induced to circulate around the spit basket to aid in evenly roasting the meat item. Rotisserie-style roasting is achieved by mechanically linking a motor to one end of the spit basket. Alternately, the arms can be manually rotated by the provision of handles included at the ends of the arms. Roasting in either mode may be accomplished with the domed lid in the open or closed position, and will depend on individual preference.

The invention satisfies the need for portability by providing a relatively lightweight device which can be easily carried and transported by two people grasping handles at opposite ends of the firebox.

BRIEF DESCRIPTION OF THE DRAWINGS

FIG. 1 is a side elevational view of the meat roaster embodying the best mode of the invention and shown with the domed lid closed over the firebox.

FIG. 2 is a perspective view of the meat roaster with the domed lid cover open, showing the spit basket in position for roasting, and being partially broken away to show the firebox interior.

FIG. 3 is a cross-sectional view taken at line 3—3 of FIG. 2.

FIG. 4 is a cross-sectional view taken at line 4—4 of FIG. 3.

FIG. 5 is a cross-sectional view of the food roaster illustrating its convertible utilization as a grill.

FIG. 6 is a partial top plan view of the grill in FIG. 5 supported by the firebox (in phantom lines).

FIG. 7 is a back view of a charcoal basket hanger shown in FIG. 5.

FIG. 8 is a perspective view of a portion of the meat roaster showing the provision of an electric rotisserie motor for continuous spit basket rotation.

DESCRIPTION OF EXAMPLE EMBODYING BEST MODE OF THE INVENTION

A roaster 10 is disclosed for roasting larger meat items, such as pig 11. A firebox 12 is rectangular in plan and connected along one of its sidewalls by hinges 13 to domed lid 14. A guiding rod 15 moves to a locked position when domed lid 14 is pivoted upward to give the cook access to the meat in the roaster. Firebox 12 and domed lid 14 provide an exterior housing for roaster 10 and are preferably made of stainless steel. Firebox 12 has vertically oriented side walls and end walls defining a box-like conformation with an open bottom 16 and open top 17. In order to hand-carry roaster 10, a pair of handles 18 are fixed to opposite end walls of firebox 12 and, in the disclosed example, are integrally formed with lower legs 19. Legs 19 extend below firebox 12 to support it above the ground and allow air to freely enter open bottom 16. Spanning across open bottom 16, cross-braces 20 rigidify the roaster and provide support surfaces for charcoal baskets 21 which are positioned generally adjacent open bottom 16.

An inturned peripheral lip 22 of lid 14 rests along an inturned peripheral lip 23 extending from the firebox walls around open top 17. When domed lid 14 is closed, heat and smoke are thereby contained during cooking.

A spit basket 24 is mounted along open top 17 which offers secure retention of pig 11 by the provision of potentially telescoping sets of grate fingers 25. The sets confront one another and are separated at a distance which can be varied by adjustment of knobs 26, as will be explained. Access to spit basket 24 and retained food is achieved by the provision of wooden handle 27 attached to lid 14. The user can monitor the roasting process by grasping the handle and pivoting the lid upwardly. If temperature adjustment is required, rotatable vent covers 28 may be adjusted to control the amount of heated gases released. To avoid hot and cold temperature zones during roasting and to achieve relatively even heating, the heated gases are induced to rise and circulate about the spit basket 24 by the alignment of charcoal baskets 21 below and to sides of the basket and by domed shape of lid 14 directing the rising heated gases back down and around the basket (FIG. 3).

FIGS. 1-4 illustrate roaster 10 having arms 29 extending from opposite sides of spit basket 24 for manually rotating the basket. The arms are removably attached. In FIG. 8 one arm 29 is removed and in its place a rotisserie assembly associates with the spit basket for continuous mechanical rotation as will be explained.

With respect to FIGS. 1-4, the arms 29 solely support the spit basket and comprise round steel rods. At opposite end walls of firebox 12, the upper peripheral lip 23 and upper edges of the end walls are gapped, or notched, to accommodate arms 29 and bearing brackets 30 (FIG. 4). Brackets 30 supportably receive arms 29 in U-shaped bearing seats to permit free rotational movement of the arms.

It will be understood that one, or both, of the arms 29 may have a non-circular cross-section, for example, a square shape would permit rotation to any one of four stable positions selected by the chef.

The main characterizing feature of the invention is the adjustability of spit basket 24. With reference to FIGS. 3 and 4 it will be seen that basket 24 comprises two confronting sets of generally bow-shaped grate fingers 25. The confronting sets of fingers are arranged to telescope when brought together and are herein referred to as upper and lower sets as oriented in the drawings. The sets of fingers form a basket-like configuration which can contract to securely grip around pig 11. Each set is affixed, as by welding, to a rectangular frame 31 which carries a set of fingers.

Four adjustment knobs 26 each thread-engage a rod 32. Two rods 32 are welded in axial alignment to a plate 33 at each end of spit basket 24. Guide rods 34 are welded to plates 33 generally parallel to threaded rods 32 and pass through tubular sleeves 35 which are fixed, also preferably by welding, to both frames 31. Tubular sleeves 36 are affixed to frames 31 and accommodate rods 32. Tubular sleeves 35 and 36 permit free movement therethrough and act as positioning guides.

Rods 32 stop short of a lock nut 37 which in cooperation with a lock nut 38 at the other side of plate 33 removably secures support arm 29 at a threaded end thereof. Arms 29 are secured to transverse T-handles 39. Turning either T-handle 39 will cause spit basket 24 to rotate to a desired orientation. Also, arms 29 and T-handles 39 provide means for easily conveying spit basket 24 with secured food articles from a kitchen or preparatory area to roaster 10. The removable feature of arms 29 allows one arm to be replaced with a rotisserie assembly for continuous rotation, as will be explained in conjunction with FIG. 8.

The upper and lower sets of grate fingers 25 are each adjustable by two adjustment knobs 26, and either set of fingers 25 may be independently adjusted to tighten or release the grip on pig 11. The upper-positioned set may be fully removed by lifting it upwardly following unthreading both of its knobs 26 from rods 32. This would typically be done at the completion of roasting in order to carve the meat. The lower set would then remain as a support during carving. Either set may be rotated by means of arms 29 to the upper position for removal and depends on the choice of the cook.

It will be observed from FIG. 4 that the grate fingers 25 of each set are spaced apart at regular intervals but the sets are horizontally offset so that individual fingers of each set do not directly oppose one another. This offset spacing aids in retaining pig 11 and also permits the sets to mesh, or "telescope", as they are brought together.

Charcoal baskets 21 preferably comprise expanded metal defining openings 40 throughout to enhance free flow of air. Cross-braces 20 are affixed, as by welding, to a peripheral ledge 41 which extends inwardly from the firebox walls around open bottom 16.

The invention further provides for conversion to a grill for cooking large numbers of small items such as hot dogs, hamburgers, and the like. With reference to FIGS. 5-7, spit basket 24 is removed and a grill arrangement substituted. This is accomplished by the provision of hangers 42 having hooked ends 43 engaging over lip 23 of firebox 12. Hangers 42 include a series of holes 44 engageable by basket supports 45. Pairs of hangers 42 are disposed at opposite sidewalls of firebox 12 and a basket support 45 extends therebetween engaged by double-bend ends 46 inserted into holes 44. In the disclosed embodiment, two pairs of hangers 42 are provided, and two basket supports 45 extend therebetween. By the provision of a series of holes 44, the basket supports 45 may be set at different levels within firebox 12, such as at 45', as chosen by the chef. Three charcoal baskets 47 are supportably disposed side-by-side on basket supports 45 to furnish a full bed of charcoal across firebox 12. Similarly, baskets 47 comprise expanded metal for free air flow through the charcoal.

A grill 48 for receiving the food to be cooked includes L-shaped shoulder edges 49 which overlap lip 23 and support grill 48 generally at open top 17. A lengthwise center rod member 50 is affixed to grill 48 and extends outwardly from opposite ends to be supportably received in bearing brackets 30. Additional rigidity is provided by a plurality of spaced-apart cross-rod members 51 extending transverse to, and at either side of, center rod 50. To allow the grill 48 to be carried, handles 52 are provided at opposite ends. The handles include braces 53 welded across the ends of the grill.

Grill 48 comprises flattened expanded metal having continuous diamond-shape openings for effective heat passage during grilling. Domed lid 14 can be closed or left open as the user may choose. Removal of grill 48 is achieved by grasping opposite grill handles 52 and lifting it from open top 17. Subsequently, charcoal baskets 47, basket supports 45, and hangers 42 may be removed leaving the firebox ready for placement of charcoal baskets 21 and spit basket 24, as in FIG. 1.

The invention further includes operation as a rotisserie for continuous rotation of large meat items during roasting. As shown in FIG. 8, a rotisserie assembly is provided in replacement of a removed arm 29 (FIGS. 1-4).

An electric rotisserie motor 54, preferably offering 6 r.p.m., is mounted and attached by conventional fastening to a motor support member 55 at support plate 56. Support member 55 includes strap hangers 57 removably engaged over lip 23 for supportive engagement on firebox 12. A reinforcing plate 58 is integrally formed with plate 50 to aid in resisting bending.

Rotisserie motor 54 turns drive shaft 59 being freely rotational and supported in bearing bracket 30. Drive shaft 59 terminates in a forked end having projections 60 associating with plate 33 and extending through holes 61 thereof. Conventional mechanical fastening, not shown, can be used to secure projections 60 to plate 33. Plate 33 includes central hole 62 which otherwise, accommodates the removed arm 29 (FIG. 4), when manual rotation is desired.

When activated by electric current, motor 54 turns drive shaft 59 and continuously rotates spit basket 24.

Spit basket 24 is fully transportable with the rotisserie assembly. At the opposite end of the basket, not shown in FIG. 8, an arm 29 is provided for hand conveyance as described (FIG. 1). Motor support member 55 is removably engaged to firebox 12 and may be lifted therefrom to remove shaft 59 from bracket 30 similar to an arm 29. Thus, the ability to carry the basket and rotisserie assembly as a unit is afforded.

It will be understood that other mechanical linkages between rotisserie motor 54 and basket 24 may be utilized. For example, an arm 29 could be provided without a transverse T-hurdle 29 and drive shaft 59 could be formed as a simple circular rod, without the forked end. They could then be mechanically coupled, such as by a universal joint, to transmit rotation to basket 24. Other equivalent mechanical linkages are considered to fall within the scope of the disclosure.

In the embodiment shown, grate fingers 25 have a spacing of three inches center-to-center and a width from tip-to-tip of about fifteen inches. Frames 31 have a length of about 49 inches and they are adjustable to have a separation distance of from about three inches to about fifteen inches. Firebox 12 has a length of about 54 inches and widtgh of about 32 inches. The height from the top of domed lid 14 to open bottom 16 is about 42 inches. Despite the large capacity of roaster 10, it is relatively lightweight. In the example disclosed roaster 10 weighs about 155 pounds and with the provision of handles 18 it may easily be carried by two people. This portability allows use in many "off the road" locations.

ACHIEVEMENTS OF THE INVENTION

The inventive meat roaster offers large capacity. The exemplary embodiment disclosed is capable of roasting a whole pig, lamb, up to five turkeys, five large chickens or one hundred pounds of roasts or pork loins. Meat items are gripped tightly in a unique spit basket, which can be continually monitored and adjusted for proper retention. If shrinkage occurs, movable grate fingers can be brought closer together to grip the food tightly. Upon completion of cooking, a set of grate fingers may be retracted and removed by simply unthreading adjustment knobs associated with that set of fingers. Carving may take place with the meat supported in the roaster by the other set of grate fingers.

The invention affords even heating. Rotation of the loaded spit basket may be done manually or mechanically by linking the basket to a rotisserie motor for continuous rotation. Vents in the lid may be adjusted to control temperature by changing the amount of heated gases released during cooking. Economy is achieved with efficient use of charcoal. For example, in cooking a sixty pound pig only about twenty pounds of charcoal would be required to complete roasting in about five or six hours. With charcoal baskets supported below but to the sides of the spit basket, and the domed lid covering the firebox, uniform temperatures are achieved while at the same time minimizing grease flare-ups.

Convertability to a grill for broiling numerous small items is provided. The entire meat roaster is freestanding, lightweight and portable. The novel spit basket is itself fully portable allowing it to be transported before or after roasting while securely retaining a load of food.

What is claimed is:

1. In a food roasted comprising a firebox generally rectangular in plan having vertically standing end walls and sidewalls and an open top and an open bottom, means for supporting said firebox above the ground, a charcoal basket disposed and supported in the lower portion of said firebox, a lid hinged to the upper edge of one of said sidewalls and a spit for supporting food to be cooked in the upper portion of said roaster, said spit being supported by said end walls of said firebox, the improvement wherein said spit comprises a basket formed by two confronting sets of generally bow-shaped grate fingers, said basket having a long axis of rotation, a frame having two members, each of said two sets having a plurality of fingers, said fingers being secured to a frame member, and means for supporting said frame, said frame members each being secured at basket-outward surfaces of one set of grate-fingers whereby the fingers alone provide food-gripping contact, said frame-supporting means being located at opposite basket ends and arranged generally transverse to said long axis and being adjustable to vary the space between said two sets of grate fingers and frame members, whereby to grip and retain the food to be roasted within said basket.

2. The improvement as in claim 1 wherein the frame-supporting means includes rotation means extending basket-outwardly at opposite ends of the basket.

3. The improvement as in claim 2 wherein the end walls include bearing means and the rotation means are rotatably supported in said bearing means.

4. The improvement as in claim 3 wherein the rotation means are removable from the bearing means.

5. The improvement as in claim 4 wherein the rotation means are disengageable from said frame-supporting means.

6. The improvement as in claim 1 wherein said frame members are generally rectangular and said sets of grate fingers are longitudinally offset from each other and are capable of telescoping together.

7. The improvement as in claim 1 wherein the frame-supporting means includes adjustment means adjustably associated with each frame member whereby either frame member may be independently adjusted to vary the space between said two sets of grate fingers.

8. The improvement as in claim 7 wherein the adjustment means includes thread engaging members.

9. The improvement as in claim 8 wherein the thread engaging members are thread disengageable permitting removal of either frame member and set of fingers secured thereto.

10. In a food roaster comprising a firebox generally rectangular in plan having vertically standing end walls and sidewalls and an open top and an open bottom, means for supporting said firebox above the ground, a charcoal basket disposed and supported in the lower portion of said firebox, a lid hinged to the upper edge of one of said sidewalls and a spit for supporting food to be cooked in the upper portion of said roaster, said spit having a long axis of rotation and rotation means coaxial with said long axis and said spit being rotatably supported at one end by an end wall of the firebox, a rotisserie motor mounted at the other end wall and said spit being rotatably driven by the rotisserie motor, the improvement wherein said spit comprises a basket formed by two confronting sets of generally bow-shaped grate fingers, a two-member frame, each of said two sets being secured to a frame member at basket-outward surfaces of said fingers, and means for supporting said frame, said frame-supporting means located at opposite ends of said frame generally transverse to said long axis and being adjustable to vary the space between said two sets of grate fingers and frame members, whereby to grip and retain the food to be roasted within said basket.

11. The improvement as in claim 10 wherein the frame-supporting means includes removable linkage means rotatably connecting the spit to the rotisserie motor.

12. A spit for supporting food during roasting, said spit comprising a basket formed by two confronting and telescoping sets of generally bow-shaped grate fingers, said basket having a long axis of rotation, a frame having two members, each of said two sets being secured to a frame member at basket-outward surfaces of said fingers whereby said fingers alone provide food-gripping contact, and means for supporting said frame, said frame-supporting means being disposed at opposite ends of said frame and arranged generally transverse to said long axis, said frame-supporting means being adjustable to vary the space between said two sets of grate fingers and frame members, whereby to grip and retain the food to be roasted within said basket.

13. A spit as in claim 12 wherein the frame-supporting means includes disengageable arm means at opposite ends of the spit whereby the spit may be supported by and between said arm means.

* * * * *